United States Patent
Tornambe et al.

(10) Patent No.: US 11,949,252 B2
(45) Date of Patent: Apr. 2, 2024

(54) MANAGING CONTACTLESS COMMUNICATION AND CONTACTLESS CHARGING FROM A CONTACTLESS DEVICE, AND CORRESPONDING CONTACTLESS DEVICE

(71) Applicant: STMicroelectronics (Rousset) SAS, Rousset (FR)

(72) Inventors: Anthony Tornambe, Rousset (FR); Nicolas Cordier, Aix-en-Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/571,705

(22) Filed: Jan. 10, 2022

(65) Prior Publication Data

US 2022/0231543 A1    Jul. 21, 2022

(30) Foreign Application Priority Data

Jan. 15, 2021    (FR) ...................................... 2100383

(51) Int. Cl.
  *H02J 50/80*    (2016.01)
  *H02J 50/40*    (2016.01)
  *H02J 50/50*    (2016.01)

(52) U.S. Cl.
  CPC .............. *H02J 50/80* (2016.02); *H02J 50/40* (2016.02); *H02J 50/50* (2016.02)

(58) Field of Classification Search
  CPC ............. H02J 50/40; H02J 50/50; H02J 50/80
  See application file for complete search history.

(56) References Cited

U.S. PATENT DOCUMENTS

| | | | |
|---|---|---|---|
| 2007/0103110 A1* | 5/2007 | Sagoo ..................... | H02J 7/342 320/109 |
| 2010/0248653 A1* | 9/2010 | Merlin ............. | G06K 19/07749 455/90.1 |
| 2013/0187598 A1* | 7/2013 | Park ....................... | H02J 50/40 320/108 |
| 2014/0327390 A1 | 11/2014 | Park et al. | |

(Continued)

FOREIGN PATENT DOCUMENTS

| | | |
|---|---|---|
| CN | 102684319 A | 9/2012 |
| CN | 103270703 A | 8/2013 |

(Continued)

OTHER PUBLICATIONS

INPI Search Report and Written Opinion for priority application, FR 2100383, report dated Sep. 27, 2021, 9 pages.

(Continued)

*Primary Examiner* — Rexford N Barnie
*Assistant Examiner* — Joseph N Inge
(74) *Attorney, Agent, or Firm* — Crowe & Dunlevy LLC

(57) ABSTRACT

A contactless device includes an impedance matching and filter circuit connected to an antenna and being on the one hand operable for contactlessly communicating with a second device via the antenna, and on the other hand operable for contactlessly charging a rechargeable power supply of a third device via the antenna. A method of control includes modifying the impedance matching and filter circuit of the contactless device depending on whether the contactless device carries out the contactless communication or carries out the contactless charging.

11 Claims, 6 Drawing Sheets

(56) References Cited

U.S. PATENT DOCUMENTS

2016/0197510 A1\* 7/2016 Strömmer ............... H04W 4/80
　　　　　　　　　　　　　　　　　　　　　　320/108
2016/0226298 A1\* 8/2016 Shimokawa ............ H02J 50/40
2020/0394486 A1 　12/2020 Rizzo

FOREIGN PATENT DOCUMENTS

| CN | 105827278 A | 8/2016 |
| CN | 107636929 A | 1/2018 |
| WO | 2009116001 A1 | 9/2009 |

OTHER PUBLICATIONS

CN First Office Action and Search Report for counterpart CN Appl. No. 202210041796.X, report dated Jun. 30, 2023, 10 pgs.

\* cited by examiner

MANAGING CONTACTLESS COMMUNICATION AND CONTACTLESS CHARGING FROM A CONTACTLESS DEVICE, AND CORRESPONDING CONTACTLESS DEVICE

PRIORITY CLAIM

This application claims the priority benefit of French Application for Patent No. 2100383, filed on Jan. 15, 2021, the content of which is hereby incorporated by reference in its entirety to the maximum extent allowable by law.

TECHNICAL FIELD

Implementations and embodiments relate to wireless or contactless communication using electronic components connected to an antenna, particularly components configured to exchange information with an external device via said antenna according to a contactless type communication protocol. Implementations and embodiments relate to the contactless charging of an object, for example but not limited to a connected watch, by a contactless device containing such components, for example incorporated within a mobile telephone of the "smartphone" type.

BACKGROUND

Such components are more simply referred to as "contactless components" and may be, for example, so-called Near Field Communication (NFC) technology components, that is to say components compatible with NFC technology.

The NFC technology component uses a near field, that is a short-distance, high-frequency wireless communication technology, which makes it possible to exchange data between two contactless devices over a short distance, for example 10 cm.

NFC technology is standardized in the documents ISO/IEC 18 092 and ISO/IEC 21 481 but incorporates a variety of pre-existing standards including the type A and type B protocols of the standard ISO/IEC 14 443.

The NFC component may be, for example, a NFC microcontroller.

An NFC microcontroller may be generally used to dialogue with another contactless device, for example by using a contactless communication protocol such as the type A protocol of the standard ISO/IEC 14 443.

Apart from the contactless communication function provided by the NFC technology, the contactless charging of a contactless device by another contactless device, using this NFC technology, is starting to emerge. In this regard, a standard of the NFC forum association, entitled "Wireless charging," is currently provided.

Thus, in NFC technology, the 13.56 MHz frequency electromagnetic field is used to carry out a conventional communication between two contactless devices and to carry out a contactless charging between, for example, a contactless device incorporated within a cellular mobile telephone of the smartphone type, and a portable contactless object, for example a connected watch, an earphone, etc.

Consequently, there is a need to propose a technical solution for a contactless device for offering both a conventional contactless communication function, and a contactless charging function, and that is particularly compact so as to be able to be easily integrated into a small-sized apparatus, for example a cellular mobile telephone of the smartphone type.

SUMMARY

According to one implementation and embodiment, it is proposed to use a single impedance matching and filter circuit and a single antenna to perform the two functions (i.e., a contactless communication function and a contactless charging function).

According to one aspect, a method for managing the operation of a contactless device is proposed.

The device includes an impedance matching and filter circuit connected to an antenna.

This device is, on one hand, capable of contactlessly communicating with a second device via said antenna.

This device is, on another hand, capable of contactlessly charging, via said antenna, a rechargeable power supply coupled to a third device during at least one charging session. The contactless communication with the second device via said antenna and the contactless charging of the rechargeable power supply means advantageously use electromagnetic fields having the same frequency, in particular an NFC frequency, for example 13.56 MHz.

A rechargeable power supply coupled to a third device is understood as being able to be incorporated into a third device or even linked to this third device but located in an object incorporating this third device.

It should be noted here, as will be explained in greater detail hereafter, that the third device may be a device different from the second device or even the second device itself.

In other terms, in this last case, the device may, for example, contactlessly communicate with the second device in order to exchange information, for example, and subsequently charge this second device if necessary.

The method according to this aspect comprises a modification of the impedance matching and filter circuit by the device depending on whether the device carries out said contactless communication function or whether it carries out said contactless charging function during said at least one charging session.

Thus, according to this aspect, the same antenna for the contactless communication and the contactless charging and an impedance matching and filter circuit of which the features can be modified, for example the capacitive and resistive values, is used.

It should be noted that the modification of the impedance matching and filter circuit is carried out by the device, advantageously automatically, for example as soon as a charging request is received.

For a contactless communication, the features of the matching and filter circuit of the device are determined, for example in the laboratory, independently of the features of any other second device with which it would have to dialogue contactlessly, because this adjustment of the impedance matching and filter circuit is carried out in absence of any metallic coupling close to the device.

However, for a contactless charging of a third contactless device, the features of the matching and filter circuit of the device are determined, for example in the laboratory, specifically for this third device, placed in the vicinity of the charger device, so as to take into account in particular the metallic structure specific to the third device and optimize as far as possible the power transfer.

According to one implementation, the impedance matching and filter circuit is a configurable circuit and said modification of the circuit comprises a placement, by the device, of said configurable circuit in a first configuration compatible with said contactless communication or a placement, by the device, of said circuit in a second configuration compatible with said contactless charging.

According to one embodiment, the device comprises a processing unit having two output terminals connected to said antenna through said filtering and impedance matching circuit, the first configuration is valid regardless of the second device and the second configuration is specific to the third device, and the filtering and impedance matching circuit is arranged so that the impedance seen at the input of the output terminals of the processing unit is constant or substantially constant within a tolerance, for example less than 10%, whatever the configuration of the filtering and impedance matching circuit.

According to one embodiment, the device comprises a control circuit and the placement of the filtering and impedance matching circuit in its first configuration or its second configuration comprises: delivery by the control circuit to said filtering and impedance matching circuit of a control signal having a first value associated with the first configuration or a second value associated with the second specific configuration of the third device; wherein the filtering and impedance matching circuit switches between its first configuration and its second configuration depending on the value of the control signal.

According to one implementation, the device is capable of charging the rechargeable power supply according to a contactless charging protocol including said at least one charging session and at least one contactless communication phase with the third device. This contactless communication phase particularly makes it possible to exchange information relating to the required charging time and/or the required charging power.

In addition, during this contactless charging protocol, the device may place the impedance matching and filter circuit in its second configuration during each charging session and in its first configuration during each contactless communication phase.

On the other hand, the contactless communication phases for exchanging charging information are generally very short phases.

Thus, alternatively, and in the interest of simplification, it is possible that the device places the impedance matching and filter circuit in its second configuration during each charging session and during each contactless communication phase.

In other terms, in this case the impedance matching and filter circuit is not modified between each charging session and each communication phase.

According to one implementation, the device changes into the contactless charging protocol in response to a first control signal emanating from the third device and starts a charging session in response to a second control signal emanating from the third device. The device may comprise a processing unit, for example a microprocessor or a microcontroller, having two output terminals connected to said antenna by means of said impedance matching and filter circuit.

This circuit may comprise: a first inductive capacitive module connected between the two output terminals and a power supply reference point, for example, the ground; a second capacitive module connected between each output terminal and the power supply reference point; and a resistive module connected between each output terminal and the power supply reference point.

According to one implementation, the modification of the impedance matching and filter circuit comprises an increase of the capacitive value of the first module, a reduction of the capacitive value of each second module and a deactivation of the resistive module, when the device changes from a contactless communication to a contactless charging during said at least one charging session.

The modification of the impedance matching and filter circuit can be carried out in response to a control signal delivered by a control circuit, for example incorporated in the processing unit, in particular in response to the first control signal or to the second control signal.

The third device may belong to a set of a plurality of possible third devices respectively associated with different configurations of the impedance matching and filter circuit of the device during a charging session.

The method may then advantageously comprise a detection by the device, of said set of the third device requiring a contactless charging and a selection by the device of the corresponding configuration of the impedance matching and filter circuit.

According to another aspect a contactless device is proposed, including an impedance matching and filter circuit connected to an antenna.

The device is, on one hand, capable of contactlessly communicating with a second device via said antenna and, on another hand, capable of contactlessly charging via said antenna a rechargeable power supply of a third device during at least one charging session.

The device comprises a control circuit configured to modify the impedance matching and filter circuit depending on whether the device carries out said contactless communication or whether it carries out said contactless charging during said at least one charging session.

According to one embodiment, the impedance matching and filter circuit is a configurable circuit, and the control circuit is configured to place the configurable circuit in a first configuration compatible with said contactless communication or in a second configuration compatible with said contactless charging.

According to one embodiment, the device is capable of charging the rechargeable power supply according to a contactless charging protocol comprising said at least one charging session and at least one contactless communication phase with the third device, and the control circuit is configured to place said circuit in its second configuration during each charging session and in its first configuration during each contactless communication phase.

According to another possible embodiment, the device is capable of charging the rechargeable power supply according to a contactless charging protocol comprising said at least one charging session and at least one contactless communication phase with the third device, and the control circuit is configured to place said circuit in its second configuration during each charging session and during each contactless communication phase.

According to one embodiment, the device is configured to change into the contactless charging protocol in response to a first control signal emanating from the third device and is configured to start a charging session in response to a second control signal emanating from the third device.

According to one embodiment, the device comprises a processing unit possessing two output terminals connected to said antenna by means of said circuit.

Said impedance matching and filter circuit comprises: a first inductive capacitive module connected between the two output terminals and a power supply reference point; a second capacitive module connected between each output terminal and the power supply reference point; and a resistive module connected between each output terminal and the power supply reference point.

The control circuit is configured to increase the capacitive value of the first module, reduce the capacitive value of each second module and deactivate the resistive module when the device changes from a contactless communication to a contactless charging during said at least one charging session.

According to one embodiment, the processing unit incorporates the control circuit.

According to one embodiment, the control circuit is configured to modify said circuit in response to the first control signal or to the second control signal.

According to one embodiment, the device comprises: a memory circuit storing a set of different configurations of the impedance matching and filter circuit that can be used during a charging session and respectively associated with a plurality of possible third devices; a detection circuit configured to detect, of said set, the third device requiring a contactless charging, and a selection circuit configured to carry out a selection of the corresponding configuration of the impedance matching and filter circuit.

According to another aspect a mobile telephone is proposed, for example of the "smartphone" type, incorporating a device such as defined above.

BRIEF DESCRIPTION OF THE DRAWINGS

Other advantages and features will become apparent upon examination of the detailed description of non-limiting implementations and embodiments, and of the appended drawings, wherein.

DETAILED DESCRIPTION

Figure 1:
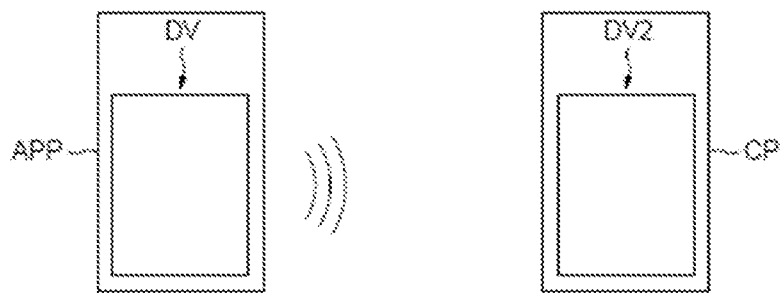
FIG. 1 shows a system including two contactless devices operating for wireless communication.

In FIG. 1, the reference DV designates a contactless device incorporated, for example, within a communication apparatus APP, such as a cellular mobile telephone of the "smartphone" type.

The reference DV2 designates a second contactless device incorporated, for example, within an object, for example a smart card CP. The device DV is capable of contactlessly communicating with the second device DV2 by using a near field contactless communication protocol, for example the type A protocol of the standard ISO/IEC 14 4443, without this being limiting, and operating at a near field contactless communication frequency (such as, for example only, a frequency of 13.56 MHz).

The second device DV2 may also be incorporated into another cellular mobile telephone so as to enable, for example, a peer-to-peer communication.

Figure 2:
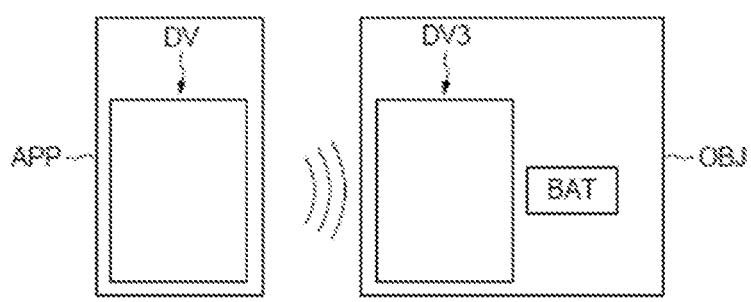
FIG. 2 shows a system including two contactless devices operating for wireless charging.

In FIG. 2, the reference DV3 designates a third contactless device, incorporated within a portable object OBJ, for example a connected watch.

FIG. 2 illustrates an application for contactlessly charging a rechargeable power supply, for example a battery BAT, of the device DV3 or of the object OBJ by the device DV.

This contactless charging may comply with the specifications indicated in the NFC Forum document entitled Wireless charging technical specification, version 1.0, 2020-03-31[VLC] to which a person skilled in the art may refer for all useful purposes, and the charging signal is also at said near field contactless communication frequency.

While FIG. 2 illustrates the application of the contactless charging function, the object OBJ may also be an object of which the device DV3 would be capable of contactlessly communicating with the device DV of the apparatus APP in accordance with the near field communications function like that illustrated in FIG. 1.

Thus, for example, the apparatus APP, for example the cellular mobile telephone, may exchange information by using the contactless communication protocol, with the object, for example the connected watch. Subsequently, the apparatus APP may recharge the object OBJ, for example the connected watch, when this is necessary.

Figure 3:
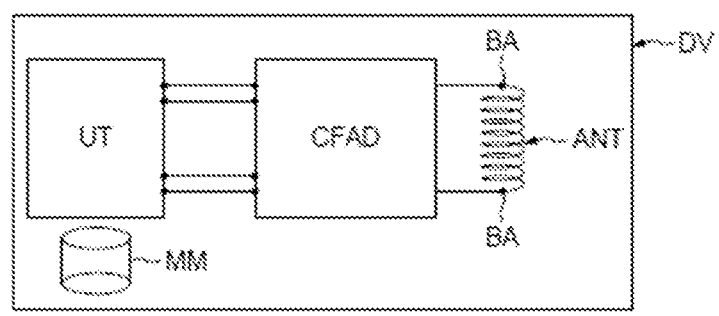
FIG. 3 is a block diagram of a contactless device.

As illustrated in FIG. 3, the contactless device DV includes a processing unit UT, for example a microcontroller of the ST54J family from STMicrolectronics, connected to the two terminals BA of an antenna ANT by means of (i.e., through) an impedance matching and filter circuit CFAD the structure of which will be described in more detail hereafter.

The device DV also includes a memory circuit MM for storing in certain applications, a content of which will be described in more detail hereafter.

Figure 4:
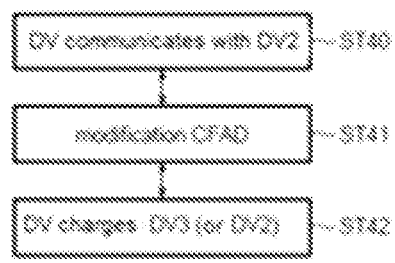
FIG. 4 is flow diagram for a method of operation.

In particular, as illustrated in FIG. 4, when the device DV switches from a contactless communication function with a second device DV2 (step ST40) to a contactless charging function of a third device DV3 (or DV2) (step ST42), a modification ST41 of the impedance matching and filter circuit CFAD is carried out by the device DV itself.

Figure 5:
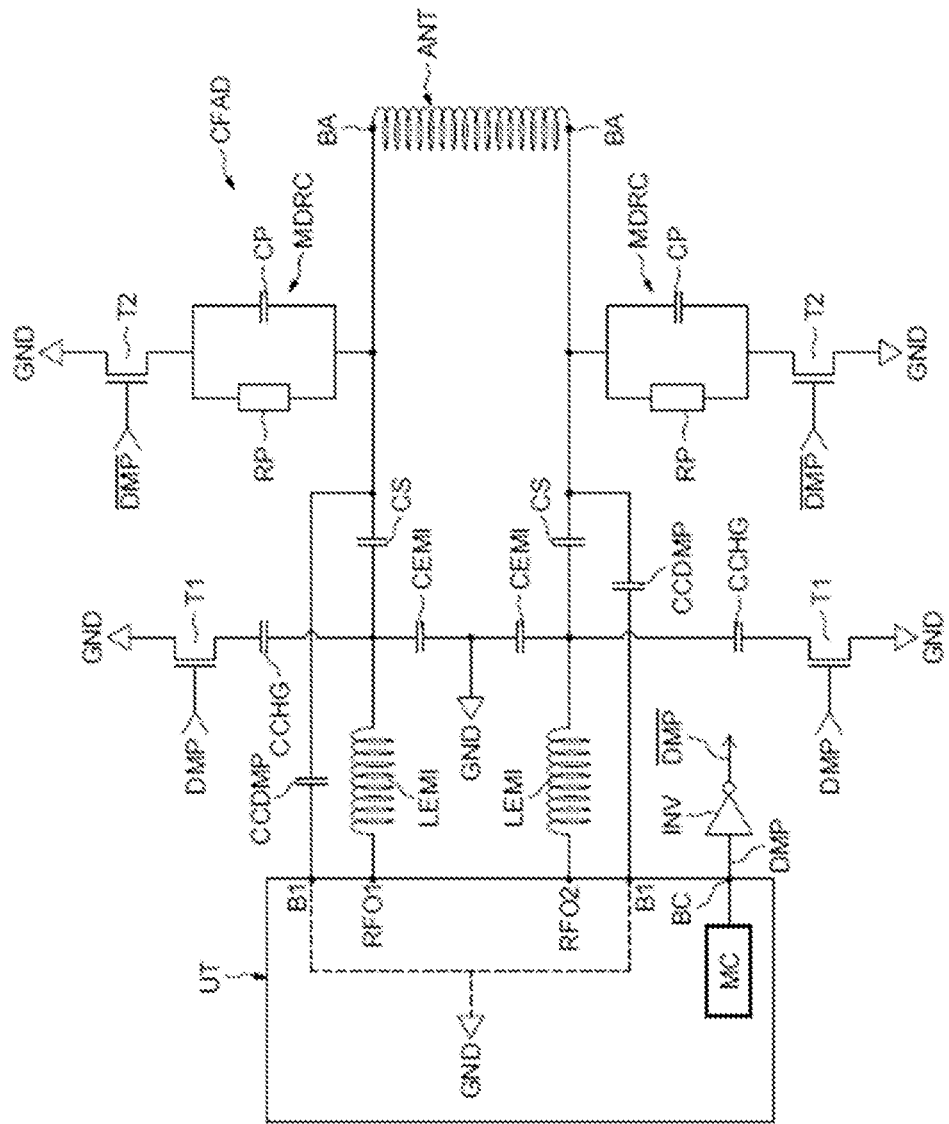
FIG. 5 is a circuit diagram of an impedance matching and filter circuit.
Figure 6:
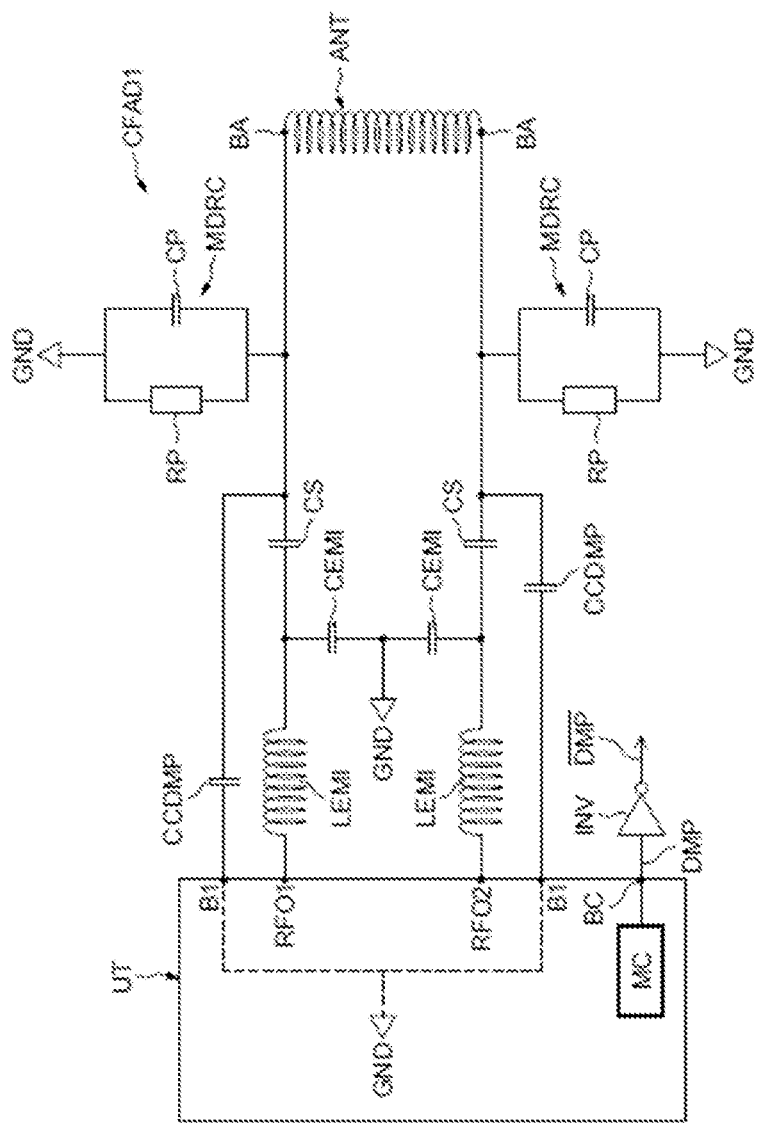
FIGS. 6 and 7 illustrate changing configurations of the impedance matching and filter circuit of FIG. 5.
Figure 7:
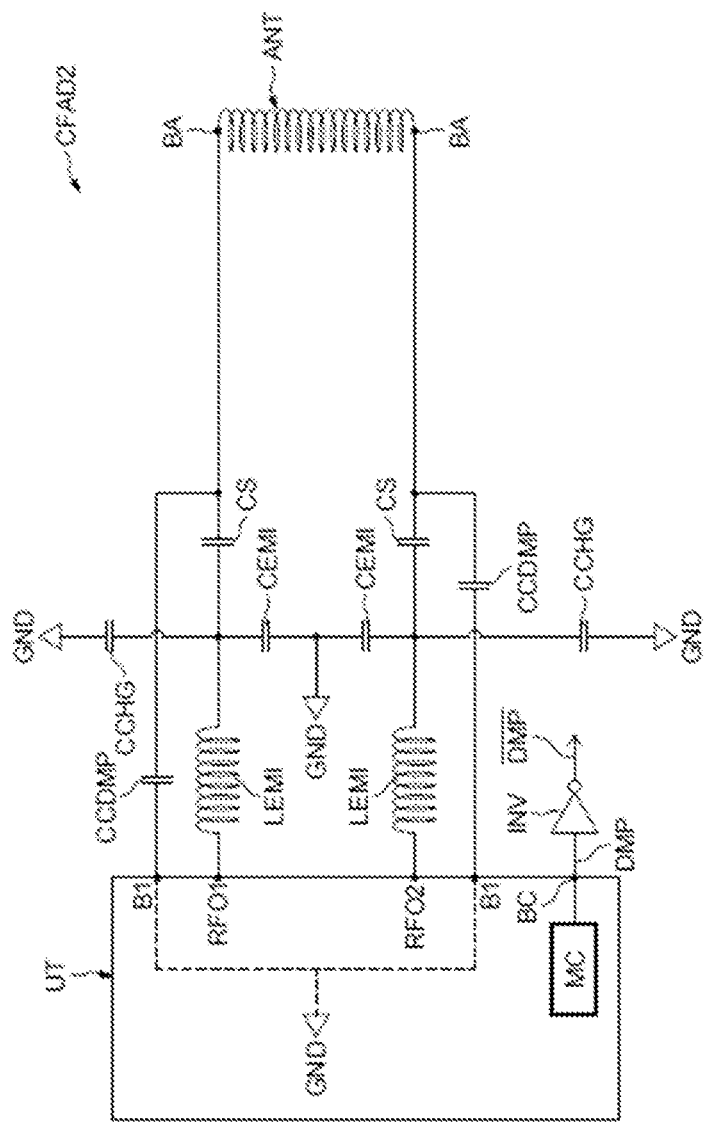

Reference is now made more particularly to FIGS. 5, 6 and 7 to describe one embodiment of an impedance matching and filter circuit CFAD that is in this embodiment, a configurable circuit.

As illustrated in FIG. 5, the circuit CFAD includes an inductive capacitive module connected between two output terminals RFO1 and RFO2 of the processing unit.

More specifically, this inductive capacitive module includes an inductive element LEMI and a capacitive element CEMI connected in series between the output terminal RFO1 and a reference node (for example, the ground GND) and an inductive element LEMI and a capacitive element CEMI connected in series between the second output terminal RFO2 and the reference node (ground GND).

This inductive capacitive module constitutes a filter for filtering the electromagnetic interference commonly designated by a person skilled in the art as an ElectroMagnetic Interference (EMI) filter. Thus, this filter makes it possible to reduce as far as possible the high harmonic emissions from the transmission signal, typically at said near field contactless communication frequency of 13.56 MHz.

Two capacitors CS are also respectively connected in series between the two inductive elements LEMI and the two terminals BA of the antenna ANT.

The circuit CFAD also includes two capacitors CCDMP respectively connected between the two terminals BA of the antenna ANT and two terminals B1 of the processing unit short-circuited internally to the reference node (ground GND).

The circuit CFAD also includes two other supplementary capacitors CCHG respectively connected between the two capacitors CEMI and the reference node (ground) through two first NMOS transistors T1.

These two first NMOS transistors are controlled on their gate by a control signal DMP.

The components LEMI, CEMI and CCHG constitute a first capacitive inductive module.

The circuit CFAD also includes two capacitive resistive modules MDRC respectively connected between the two antenna terminals BA and the reference node (ground GND) through two second NMOS transistors T2 controlled on their gate by the control signal $\overline{DMP}$, opposite of the signal DMP.

Each capacitive resistive module MDRC includes a resistor RP and a capacitor CP in parallel.

Each capacitor CCDMP and each capacitor CP constitute a second capacitive module connected between the corresponding output terminal RFO1 or RFO2 and the reference node (ground GND).

Similarly, each resistor RP constitutes a resistive module connected between the corresponding output terminal RFO1 or RFO2 and the reference node (ground GND).

The processing unit also includes control circuit MC that can be implemented, for example, by a logic circuit or by a software module, delivering on a terminal BC of the processing unit the control signal DMP.

An inverter INV connected to this control terminal BC delivers the opposite signal $\overline{DMP}$.

The control circuit MC are therefore configured to modify, by means of signals DMP and $\overline{DMP}$, the circuit CFAD and make it take in particular the two configurations CFAD1 and CFAD2 respectively illustrated in FIGS. 6 and 7.

The configuration CFAD1 illustrated in FIG. 6 can be used during a contactless communication session between the device DV and another contactless device whereas the configuration CFAD2 illustrated in FIG. 7 can be used at least during each contactless charging session.

Indeed, during a contactless communication session, the impedance matching is carried out without coupling, that is to say without metallic portion around the antenna ANT of the device DV, so as to obtain optimized NFC communication performance at said near field contactless communication frequency in a wide operational volume whereas during a contactless charging, the impedance matching is carried out when the antenna ANT is coupled to the object to be charged so as to have an optimized power transfer towards this object also at said near field contactless communication frequency.

The aim is to have a substantially constant impedance as input of the terminals RFO1 and RFO2, for example an impedance of 7 ohms, whether for a contactless communication or for a contactless charging.

Generally, the control circuit MC is configured to: increase the capacitive value of the first module LEMI, CEMI, CCHG; reduce the capacitive value of each second module CCDMP, CP; and deactivate the resistive module RP; when the device changes from a contactless communication to a contactless charging during said at least one charging session.

Thus, more specifically, in order to change into the first configuration CFAD1 (FIG. 6), that can be used for a contactless communication, the control circuit delivers the signal DMP with the logic value zero, which has the consequence of "deactivating" the capacitors CCHG and "activating" the resistors RP and the capacitors CP.

In order to change into the second configuration CFAD2 (FIG. 7), the control circuit delivers the control signal DMP to the logic value 1, which has the consequence of "activating" the capacitors CCHG and "deactivating" the resistors RP and the capacitors CP.

Thus, by way of example for a particular third device to be charged, a capacitive value of 560 picofarads for the capacitors CEMI, a capacitive value of 32 picofarads for the capacitors CP, a resistive value of 1500 ohms for the resistors RP, a capacitive value of 78 picofarads for the capacitors CCDMP and a capacitive value of 200 picofarads for the capacitors CS can be chosen.

Thus, it can be seen that the capacitive value of the first capacitive inductive module CEMI, LEMI, CCHG, changes from 560 picofarads during an NFC communication session to a value of 1230 picofarads in a contactless charging mode session.

However, the capacitive value of the second capacitive module CCDMP, CP, changes from 110 picofarads in NFC communication mode to 78 picofarads in contactless charging mode.

In addition, the resistive value of the resistive module changes from 1500 ohms in NFC communication modes to "high impedance" in contactless charging mode ("deactivated" resistive module).

Of course, a person skilled in the art will know how to adjust these values depending on the type of third device to be charged.

Figure 8:
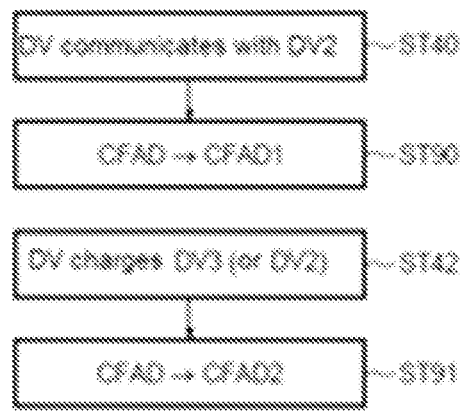
FIG. 8 is flow diagram for a method of operation.

Thus, as indicated above and as illustrated in FIG. 8, when the device DV contactlessly communicates with a second device DV2 according to a contactless communication protocol in step ST40, the device DV changes the circuit CFAD into the first configuration CFAD1 (step ST90) whereas when the device DV charges a device DV3 or DV2 during a charging session (step ST42), the device DV changes the circuit CFAD into its second configuration CFAD2 (step ST91).

Figure 9:
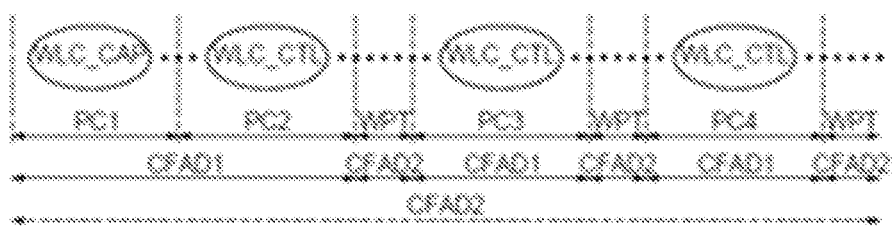
FIG. 9 illustrates an example of a contactless charging protocol.

Reference is now made more particularly to FIG. 9 to illustrate an example of a contactless charging protocol compliant with the "Wireless Charging" specification of the NFC Forum, mentioned above.

A person skilled in the art may refer to this document for all useful purposes.

This FIG. 9 illustrates in a very simplified manner a negotiated mode of contactless charging.

In this negotiated mode, first of all there is a first communication phase PC1 between the device DV (charger) and the contactless device to be charged (device DV3).

This first communication phase PC1 is carried out according to the contactless communication protocol.

The specification of the NFC Forum platform entitled "Simple NDEF Exchange Protocol, Technical Specification version 1.0, 2017-03-14 [SNEP]", to which a person skilled in the art may refer for all useful purposes, defines types of messages that are exchanged in the NFC communication protocol. In addition, of these NDEF messages, appears a message WLC_CAP that is exchanged between the device DV3 and the device DV. The device DV3 thus notifies the device DV that the object wherein it is incorporated, may be recharged.

When the device DV receives this signal WLC_CAP, its state machine changes and the device DV changes into a contactless charging mode ("NFC Charging").

A second communication phase PC2 then starts between the device DV and the device DV3, phase during which again NDEF messages are exchanged according to a contactless communication mode and of which appears a message WLC_CTL.

This message WLC_CTL contains the charging information that is to say particularly the required charging time and charging power.

The reception of the message WLC_CAP acts as a first control signal whereas the reception of the signal WLC_CTL acts as a second control signal.

The second communication phase PC2 is followed by a charging session WPT of which the features have been defined in the second control signal WLC_CTL.

Other charging cycles may follow, here two supplementary charging cycles, including respectively communication phases PC3 and PC4 and charging sessions WPT.

In a first alternative embodiment, the device DV may configure its impedance matching and filter circuit CFAD in the first configuration CFAD1 during the phases PC1, PC2, PC3 and PC4.

However, in response to the second control signal WLC_CTL, the device DV will configure its impedance matching and filter circuit CFAD in the second configuration CFAD2 that will be used during charging sessions WPT.

Alternatively, it is possible that the device DV configures its impedance matching and filter circuit CFAD in the second configuration CFAD2 as of receipt of the first control signal WLC_CAP (as illustrated by the dotted lines on the bottom portion of FIG. 9).

As seen above, the configuration CFAD1 is independent of the device DV2 for contactlessly communicating with the device DV, since this configuration is established in the absence of any coupling.

However, the second configuration CFAD2 depends on the features of the object to be recharged, and in particular on the presence of metallic elements on this object.

Figure 10:
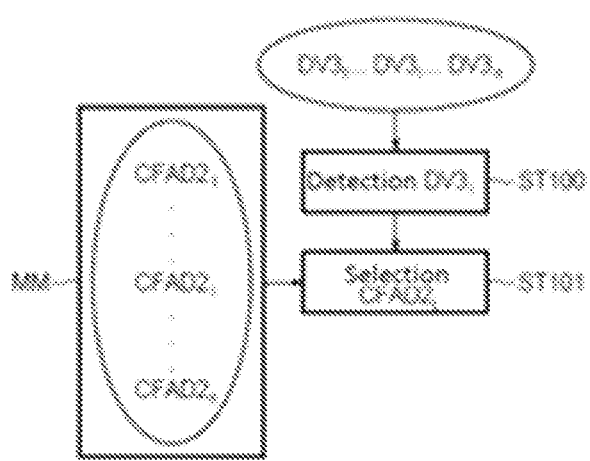
FIG. 10 schematically illustrates configuration selection.

Thus, it is possible, as illustrated in FIG. 10, that the memory circuit MM of the device DV include a set of n second configurations $CFAD2_1$, $CFAD2_i$, . . . , $CFAD2_n$ respectively associated with n devices DV3$i$, DV3$n$ that may possibly be charged by the device DV.

In practice these various configurations may be implemented, for example, by a plurality of supplementary capacitors CCHG in parallel respectively connected to a plurality of first transistors T1 of which the respective gates would be respectively controlled by a plurality of control signals DMP.

Similarly, a plurality of modules MDRC may also be respectively connected to a plurality of second transistors T2 of which the respective gates would be respectively controlled by a plurality of control signals $\overline{DMP}$.

Alternatively, these multiple capacitor-transistor branches may be replaced by varistors.

When there are a plurality of possible third devices, the device DV may detect the presence of one of these devices to be charged, for example the device DV3$_i$ (step ST100) so as to select (step ST101) the corresponding configuration CFAD2$_i$.

These various devices may be, for example, identified thanks to the content of the optional fields of the message WLC_CAP, for example.

The invention is not limited to the embodiments and implementations that have just been described.

Thus, it would be possible to store for the same third device to be charged, a plurality of possible configurable circuits CFAD, and have tested by the charger device DV, for each possible circuit CFAD, the current consumed by the device DV for the emission of the electromagnetic field, in order to select the circuit CFAD corresponding to an efficiency objective.

The invention claimed is:

1. A contactless device, comprising:
   an impedance matching and filter circuit connected to an antenna;
   a control circuit configured to modify the impedance matching and filter circuit to have a first configuration in support of the contactless device operating to carry out a contactless communication with a second device during a communications session and to modify the impedance matching and filter circuit to have a second configuration in support of the contactless device operating to carry out said contactless charging of a third device during a charging session;
   wherein the contactless device comprises a processing unit possessing first and second output terminals coupled to corresponding first and second terminals of said antenna through said impedance matching and filter circuit;
   wherein said impedance matching and filter circuit comprises:
   a first inductor connected between the first output terminal and a first intermediate node;
   a second inductor connected between the second output terminal and a second intermediate node;
   a first capacitor connected between the first intermediate node and a ground node;
   a second capacitor connected between the second intermediate node and the ground node;
   a third capacitor connected between the first intermediate node and the first terminal of the antenna;
   a fourth capacitor connected between the second intermediate node and the second terminal of the antenna;
   a fifth capacitor connected between the first terminal of the antenna and the ground node;
   a sixth capacitor connected between the second terminal of the antenna and the ground node;
   a seventh capacitor and first switch connected in series between the first intermediate node and the ground node;
   an eighth capacitor and second switch connected in series between the first second intermediate node and the ground node;
   wherein said first and second switches are open when in the first configuration and closed when in the second configuration;
   a first parallel resistor-capacitor circuit and third switch connected in series between the first antenna terminal and the ground node;
   a second parallel resistor-capacitor circuit and fourth switch connected in series between the second antenna terminal and the ground node;
   wherein said third and fourth switches are closed when in the first configuration and open when in the second configuration.

2. The contactless device according to claim 1, wherein the contactless communication with the second device via said antenna and the contactless charging of the third device via said antenna each use an electromagnetic field having a same frequency.

3. The contactless device according to claim 2, wherein said same frequency is a near field communications frequency of 13.56 MHz.

4. The contactless device according to claim 1, wherein said second device and said third device are a same device.

5. The contactless device according to claim 1, wherein said second device and said third device are different devices.

6. The contactless device according to claim 1, wherein the first configuration is compatible with contactless communication at a first frequency and said second configuration is compatible with contactless charging at a second frequency, and wherein the first and second frequencies are a same frequency.

7. The contactless device according to claim 1, wherein the contactless device operates in support of contactless communication with the second device in accordance with a near field communications protocol.

8. The contactless device according to claim 1, wherein the contactless device operates in support of contactless charging in accordance with a contactless charging protocol comprising said at least one charging session and at least one contactless communication phase, and wherein the contactless device places said impedance matching and filter circuit in said second configuration during each charging session and during said at least one contactless communication phase.

9. The contactless device according to claim 8, wherein the contactless device is configured to change into the contactless charging protocol in response to a first control signal received from the third device and start the charging session in response to a second control signal received from the third device.

10. The contactless device according to claim 1, further comprising:
- a memory circuit storing a set of different configurations of the impedance matching and filter circuit for use during the charging session and respectively associated with a plurality of possible third devices;
- a detection circuit configured to detect one device of said plurality of possible third devices requiring contactless charging; and
- a selection circuit configured to select the configuration of the impedance matching and filter circuit corresponding to the detected one device.

11. A mobile telephone, incorporating said contactless device according to claim 1.

* * * * *